United States Patent
Li et al.

(10) Patent No.: US 11,246,135 B2
(45) Date of Patent: Feb. 8, 2022

(54) RESOURCE SELECTION METHOD AND APPARATUS UNDER MULTIPLE CARRIERS, COMPUTER DEVICE, AND STORAGE MEDIUM

(71) Applicant: CHINA ACADEMY OF TELECOMMUNICATIONS TECHNOLOGY, Beijing (CN)

(72) Inventors: Chenxin Li, Beijing (CN); Rui Zhao, Beijing (CN); Li Zhao, Beijing (CN); Lin Lin, Beijing (CN); Yuan Feng, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 55 days.

(21) Appl. No.: 16/648,235

(22) PCT Filed: Jun. 21, 2018

(86) PCT No.: PCT/CN2018/092245
§ 371 (c)(1),
(2) Date: Mar. 18, 2020

(87) PCT Pub. No.: WO2019/052249
PCT Pub. Date: Mar. 21, 2019

(65) Prior Publication Data
US 2020/0288473 A1    Sep. 10, 2020

(30) Foreign Application Priority Data
Sep. 18, 2017    (CN) .......................... 201710842497.5

(51) Int. Cl.
*H04L 12/28* (2006.01)
*H04W 72/04* (2009.01)
(Continued)

(52) U.S. Cl.
CPC ....... *H04W 72/0453* (2013.01); *H04L 5/0098* (2013.01)

(58) Field of Classification Search
CPC .......................... H04L 5/0098; H04W 72/02; H04W 72/0453; H04W 74/0808; H04W 74/0816
(Continued)

(56) References Cited

U.S. PATENT DOCUMENTS 10,701,677 B2*  6/2020  Park ........................ H04L 1/1671
2006/0259744 A1* 11/2006  Matthes .............. G06F 15/7867
                                                                712/220

FOREIGN PATENT DOCUMENTS

CN    102870482 A    1/2013
CN    103475458 A    12/2013
(Continued)

OTHER PUBLICATIONS

LG Electronics, "List of agreements for "Support for V2V services based on LTE sidelink"", RAN WG1 Meeting #86, Gothenburg, Sweden Aug. 22-26, 2016, total 46 pages, R1-168217.
(Continued)

*Primary Examiner* — John Pezzlo
(74) *Attorney, Agent, or Firm* — Kilpatrick Townsend & Stockton, LLP

(57) ABSTRACT

Disclosed are a resource selection method and apparatus under multiple carriers, a computer device and a storage medium. The resource selection method comprises: determining at least one candidate carrier according to a resource occupancy exclusion result on each carrier; setting a resource on the candidate carrier to be available, performing exclusion according to a sensing result and obtaining a set of available resources; selecting a transmission resource from the set of available resources, and setting a semi-persistent scheduling counter for resource scheduling. The present
(Continued)

application provides a resource selection solution reducing half-duplex influence as far as possible, and reducing the impact due to loss of receiving opportunities and the number of skip subframes, and also avoids the problem of too severe power allocation caused by simultaneous transmission with multiple service packets.

18 Claims, 4 Drawing Sheets

(51) Int. Cl.
*H04L 5/00* (2006.01)
*H04J 1/16* (2006.01)

(58) Field of Classification Search
USPC .......................................... 370/252, 329, 445
See application file for complete search history.

(56) References Cited

FOREIGN PATENT DOCUMENTS

| | | |
|---|---|---|
| CN | 106470499 A | 3/2017 |
| WO | 2017150958 A1 | 9/2017 |

OTHER PUBLICATIONS

Samsung, "Mode-4 support in V2X CA", 3GPP TSG RAN WG1 #90, Prague, Czechia, Aug. 21-25, 2017, total 5 pages, R1-1713526.
Guangdong OPPO Mobile Telecom, "Mode 4 support in eV2X carrier aggregation", 3GPP TSG RAN WG1 Meeting #90, Prague, P.R. Czechia Aug. 21-25, 2017, total 5 pages, R1-1713251.
Catt. "Discussion on Carrier Aggregation for Mode 4 in V2X Phase 2". 3GPP TSG RAN WG1 Meeting #90. R1-1712339, Aug. 21-25, 2017.
Catt et al. "WF on Resource Selection for CA in V2X". 3GPP TSG RAN WG1 Meeting #90. R1-1714943, Aug. 21-25, 2018.

\* cited by examiner

RESOURCE SELECTION METHOD AND APPARATUS UNDER MULTIPLE CARRIERS, COMPUTER DEVICE, AND STORAGE MEDIUM

The application is a National Stage of International Application No. PCT/CN2018/092245, filed on Jun. 21, 2018, which claims the priority of the Chinese patent application which is submitted to the National Intellectual Property Administration, PRC on Sep. 18, 2017, and has the application number of 201710842497.5 and the application name of "Resource selection method and apparatus under multiple carriers, a computer device, and storage medium", and all above contents are combined in the application through quotation.

FIELD

The application relates to the technical field of wireless communication, in particular to a resource selection method and apparatus under multiple carriers, a computer device, and a storage medium.

BACKGROUND

In an existing 3GPP protocol version, LTE (Long Term Evolution)-V2X (Vehicle to Everything) carries out business transmission on a single carrier, does not support carrier aggregation, only carries out transmission resource selection on the single carrier, and does not support carrier selection under a situation of multiple carriers.

FIG. 1 is a resource distribution time sequence schematic diagram, wherein m is a service packet arrival moment/resource selection moment, T1 and T2 are independently an top edge and a lower edge of a resource selection window, d is a moment when transmission resources exist, and P*i is a business cycle. As shown in FIG. 1, the selection of the transmission resources on the LTE-V2X single carrier at present includes the following steps:

1: marking candidate resources in the resource selection window to be available; and 2: excluding occupied resources, wherein the occupied resources include two categories:

the first category is that in a sensing window, UE (User Equipment) carries out transmission but cannot monitor service packets transmitted by other UE on a transmission subframe, wherein the above subframe is called a skip subframe, it is assumed that other UE on the subframe reserves a next resource by cycles configured by a system, in addition, reserved resources are overlapped with a candidate subframe, or are overlapped with 1,2, . . . ,10 counter-1 transmission subframes behind the candidate subframe, and the above candidate subframe needs to be excluded.

the second category is that SA (Scheduling Assignment) transmitted from other UE is monitored in the sensing window, according to the cycle and resource reservation information obtained from the SA, if the reserved resources are overlapped with the candidate resources or are overlapped with 1,2, . . . ,10 counter-1 transmission resources behind the candidate subframe, the corresponding candidate resources need to be excluded according to a threshold value higher than PSSCH-RSRP (Physical Sidelink Shared Channel Reference Signal Received Power) measured by the SA.

if a ratio of residual resources is lower than 20% after the corresponding candidate resources are excluded in the second step, the threshold value is increased by 3 dB, an exclusion procedure is executed again until the ratio of residual resources is 20% or above.

3: the candidate resources are subjected to S-RSSI (Sidelink-Received Signal Strength Indication) measurement and sorting, 20% of resources having a lowest S-RSSI measurement value are selected, and resource selection is carried out by a high level from the above 20% of resources.

After the resource selection is finished, an SPS (Semi-Persistent Schedule) counter for scheduling selected resources is arranged.

An existing LTE-V2X resource selection method at least has one of the following problems:

an existing resource selection mechanism only aims at the resource selection of a single carrier, and therefore, a more serious half-duplex influence (the loss of more receiving opportunities due to the increase of the number of skip subframes) on multiple carriers due to introduction of carrier aggregation cannot be avoided;

the existing resource selection mechanism only aims at the resource selection of the single carrier, and does not consider an influence that each transmission power is lowered if transmission is carried out under multiple carriers on the same subframe; and when a plurality of segmented service packets from a same service packet are transmitted, the independent execution of the existing mechanism cannot guarantee consistent resource selection/reselection behaviors.

SUMMARY

The application provides a resource selection method and a resource selection device under multiple carriers, a computer device, and a storage medium, and is used for aiming at the problems that receiving opportunities are lost and system performance is affected since more obvious half-duplex influences are caused when business is transmitted on multiple carriers after carrier aggregation is introduced.

The embodiment of the application provides a resource selection method under multiple carriers, including the following steps:

determining at least one candidate carrier according to a resource occupation exclusion result on each carrier;

setting resources on the candidate carrier to be available, and carrying out a resource exclusion procedure on the resources according to a sensing result to obtain an available resource set; and selecting transmission resources from the available resource set, and setting an SPS counter for resource scheduling.

Optionally, the selecting the transmission resources from the available resource set comprises: sorting an S-RSSI, and selecting the transmission resources from the available resource set with lower S-RSSI.

Optionally, the carrying out resource exclusion procedure on the resources to obtain the available resource set includes:

on the candidate carrier, excluding the candidate resource corresponding to a skip subframe; and/or, on the candidate carrier, respectively excluding the reserved resources corresponding to the occupied resources;

after the resource exclusion procedure on the resources, calculating to obtain a ratio of residual resources respectively according to the size of each service packet, and if the ratio does not completely achieve or is not higher than a configured ratio threshold value, executing an exclusion procedure again after a received power threshold value is added with a preset value each time until the ratio completely achieves or is higher than the configured ratio threshold value after resource exclusion procedure on the resources; and taking the available resources obtained when the ratio completely achieves or is higher than the configured ratio threshold value as the available resource set.

Optionally, the carrying out resource exclusion procedure on the resources to obtain the available resource set according to the sensing result includes:

on the candidate carrier, excluding the candidate resource corresponding to the skip subframe; and/or, on the candidate carrier, respectively excluding the reserved resources corresponding to the occupied resources;

after resource exclusion procedure on the resources, determining the number of available subframes, and if the quantity of the available subframes or a ratio of the available subframes in candidate resource subframes does not achieve or is not higher than a configured number threshold value or a ratio threshold value, executing the exclusion procedure again after the received power threshold value is added with a preset value each time until the quantity of the available subframes or the ratio of the available subframes in the candidate resource subframes achieves or is higher than the configured number threshold value or the ratio threshold value after resource exclusion procedure on the resources, wherein the available subframes is capable of simultaneously transmitting service packets; and taking the available resources obtained when the quantity of the available subframes or the ratio of the available subframes in the candidate resource subframes achieves or is higher than the configured number threshold value or the ratio threshold value as the available resource set.

Optionally, the selecting the transmission resources from the available resource set includes:

on each candidate carrier, carrying out S-RSSI power sorting in the available resource set, and selecting available resources which have the lowest power and achieve a configuration ratio as an available resource subset;

according to an order, selecting available transmission resources for each transmission service packet in sequence; and respectively selecting the transmission resource for each service packet from the available transmission resources, or selecting transmission resources for other service packets from the available transmission resources after the transmission resource is selected for a first transmission service packet from the available transmission resources.

Optionally, the selecting the transmission resource for each service packet from the available transmission resources includes:

in the available resource subset, determining a maximum quantity of transmission allowed on the same subframe when the transmission power is not lower than configured reliable transmission power according to a configured maximum quantity of transmission or according to a calculation;

determining available resources overlapped with other service packets transmitted by same UE on a time domain, and marking the available resources as a preferentially selected resource subset;

randomly selecting the transmission resources from the preferentially selected resource subset, wherein the transmission resources are resources on which the available transmission power is lower than or equal to the configured reliable transmission power threshold value and the quantity of transmission in the same subframe does not exceed the configured maximum quantity of transmission in the same subframe, after the available transmission power or the quantity of transmission in the same subframe is calculated according to a total quantity of retransmission on the subframe where the transmission resources are located;

with the selected transmission resources, selecting retransmission resources from the preferentially selected resource subset under a condition that the restriction of retransmission resource selection for same service packet is met; and determining the transmission resource from the retransmission resources, wherein the transmission resource is a resource on which the available transmission power is lower than the configured reliable transmission power threshold value, or the quantity of transmission is greater than the configured maximum quantity of transmission.

Optionally, the randomly selecting the transmission resource from the preferentially selected resource subset further includes:

if a quantity of selection achieves a configured quantity threshold value, randomly selecting the transmission resource from the available resource subsets except the preferentially selected resource subset.

Optionally, the selecting retransmission resource further includes:

if the quantity of selection achieves the configured quantity threshold value in a process of determining the transmission resource from the retransmission resources, randomly selecting the retransmission resource from the available resource subsets except the preferentially selected resource subset.

Optionally, the order is determined according to a magnitude of frequency domain resources occupied by the transmission service packet and/or a carrier number corresponding to the transmission service packet when the transmission resources are selected for each transmission service packet in sequence according to the order.

Optionally, the selecting the transmission resources from the available resource set includes:

on each candidate carrier, carrying out an S-RSSI power sorting in the available resource set, and selecting the available resource which has the lowest power and achieves the configuration ratio as the available resource subset;

according to the order, selecting the available transmission resource for each transmission service packet in sequence;

selecting a subframe which meets the quantity of retransmission and initial retransmission transmission resource restriction for the first transmission service packet from the available transmission resources, and selecting the transmission resource for the first transmission service packet on the selected subframe; and respectively selecting transmission resources for other service packets from the available transmission resources.

Optionally, the respectively selecting transmission resources for other service packets from the available transmission resources includes:

distributing the transmission resource to the current service packet on the available subframe where the resources are selected for the previous service packet; and when a situation that transmission power is not lower than the configured reliable transmission power is met according to configuration or calculation, determining the allowable maximum quantity of transmission on the same subframe, and if the quantity of transmission on the current subframe for resource distribution exceeds the restriction of a maximum quantity of transmission, reselecting for the current service packet other available subframes which are not selected to distribute the transmission resources.

Optionally, the S-RSSI power sorting used for sorting is an RSSI linear mean value of residual resources on the subframe.

Optionally, the setting the SPS counter used for resource scheduling includes: randomly selecting the SPS counter in a configured SPS counter range to serve as the SPS counter of the service packets for the current resource selection.

The embodiment of the application provides a computer device, which includes a memory, a processor and a computer program which is stored in the memory and can operate on the processor, wherein the processor is configured to execute the computer program to realize a resource selection under multiple carriers according to followings:

determining, at least one candidate carrier, according to a resource occupation exclusion result on each carrier;

setting resources on the candidate carrier to be available, carrying out resource exclusion procedure on the resources according to a sensing result to obtain an available resource set; and selecting a transmission resource from the available resource set, and setting an SPS counter for resource scheduling.

Optionally, the selecting the transmission resource from the available resource set includes: sorting an S-RSSI, and selecting the transmission resource from the available resource subset with lower S-RSSI.

Optionally, the carrying out resource exclusion procedure on the resources according to the sensing result to obtain the available resource set includes:

on the candidate carrier, excluding the candidate resource corresponding to a skip subframe, and/or respectively excluding reserved resources corresponding to occupied resources on the candidate carrier;

after resource exclusion procedure on the resources, calculating according to a size of each service packet to obtain a ratio of residual resources, if the ratio does not completely achieve or is not higher than a configured ratio threshold value, executing the exclusion procedure again after a received power threshold value is added with a preset value each time until the ratio achieves or is higher than the configured ratio threshold value after resource exclusion procedure on the resources; and taking the available resource obtained when the ratio completely achieves or is higher than the configured ratio threshold value as the available resource set.

Optionally, the excluding according to the sensing result to obtain the available resource set includes:

on the candidate carrier, excluding the candidate resource corresponding to the skip subframe, and and/or respectively excluding the reserved resources corresponding to the occupied resources on the candidate carrier;

after resource exclusion procedure on the resources, determining the quantity of available subframes, and if the quantity of the available subframes or a ratio of the available subframes in candidate resource subframes does not achieve or is not higher than a configured number threshold value or a ratio threshold value, executing the exclusion procedure again after the received power threshold value is added with a preset value each time until the quantity of the available subframes or the ratio of the available subframes in candidate resource subframes achieves or is higher than the configured number threshold value or the ratio threshold value after resource exclusion procedure on the resources, wherein the available subframes is capable of simultaneously transmitting the service packets; and taking the available resources obtained when the quantity of the available subframes or the ratio of the available subframes in the candidate resource subframes achieves or is higher than the configured number threshold value or the ratio threshold value as the available resource set.

Optionally, the selecting the transmission resource from the available resource set includes:

on each candidate carrier, carrying out an S-RSSI power sorting in the available resource set, and selecting the available resource which has the lowest power and achieves a configuration ratio as an available resource subset;

according to an order, selecting the available transmission resources for each transmission service packet; and selecting the transmission resource for each service packet from the available transmission resources, or selecting the transmission resources for other service packets from the available transmission resources after the transmission resource is selected for a first transmission service packet from the available transmission resources.

Optionally, the selecting the transmission resource for each service packet from the available transmission resources includes:

in the available resource subset, determining a maximum quantity of transmission allowed on the same subframe when the transmission power is not lower than configured reliable transmission power according to a configured maximum quantity of transmission or according to calculation;

determining available resources overlapped with other service packets transmitted by same UE on a time domain, and marking as a preferentially selected resource subset;

randomly selecting the transmission resources from the preferentially selected resource subset, wherein the transmission resources are resources on which the available transmission power is lower than or equal to the configured reliable transmission power threshold value or the quantity of transmission in the same subframe does not exceed the configured maximum quantity of transmission in the same subframe, after the available transmission power or the quantity of transmission in the same subframe is calculated according to a total quantity of retransmission on the subframe where the transmission resources are located;

with the selected transmission resources, selecting retransmission resources from the preferentially selected resource subset under a condition that the restriction of retransmission resource selection for same service packet is met; and determining the transmission resource from the retransmission resources, wherein the transmission resource is a resource on which the available transmission power is lower than the configured reliable transmission power threshold value, or the quantity of transmission is greater than the configured maximum quantity of transmission.

Optionally, the selecting the transmission resource from the preferentially selected resource subset further includes:

if the quantity of selection achieves a configured quantity threshold value, randomly selecting the transmission resource from the available resource subsets except the preferentially selected resource subset.

Optionally, the selecting the retransmission resources further includes:

if the quantity of selection achieves the configured quantity threshold value in a process of determining the transmission resource from the retransmission resource, randomly selecting the retransmission resource from the available resource subsets except the preferentially selected resource subset.

Optionally, the order is determined according to a magnitude of frequency domain resources occupied by the transmission service packet and/or a carrier number corresponding to the transmission service packet when the transmission resources are selected for each transmission service packet in sequence according to the order.

Optionally, the selecting the transmission resource from the available resource set includes:

on each candidate carrier, carrying out an S-RSSI power sorting in the available resource set, and selecting the available resource which has the lowest power and achieves the configuration ratio as an available resource subset;

according to the order, selecting the available transmission resource for each transmission service packet in sequence;

selecting a subframe which meets the quantity of retransmission and initial retransmission transmission resource restriction for a first transmission service packet from the available transmission resources, and selecting the transmission resource for the first transmission service packet on the selected subframe; and respectively selecting transmission resources for other service packets from the available transmission resources.

Optionally, the respectively selecting transmission resources for other service packets from the available transmission resources includes:

distributing the transmission resource to the current service packet on the available subframe where the resources are selected for the previous service packet; and when a situation that transmission power is not lower than the configured reliable transmission power is met according to configuration or calculation, determining the allowable maximum quantity of transmission on the same subframe, and if the quantity of transmission on the subframe of the current distribution resource exceeds the restriction of a maximum quantity of transmission, selecting for the current service packet other available subframes which are not selected to distribute the transmission resources.

Optionally, the S-RSSI power sorting used for sorting is the RSSI linear mean value of residual resources on the subframe.

Optionally, the arrangement of the SPS counter used for resource scheduling is that the SPS counter is randomly selected in a configured SPS counter range to serve as the SPS counter of the service packets for the current resource selection.

The embodiment of the application provides a computer readable storage medium configured to store a computer program capable of executing the resource selection method under multiple carriers.

The embodiment of the application provides a resource selection device under multiple carriers, and the resource selection device includes:

a carrier determining module, configured to determine at least one candidate carrier according to a resource occupation exclusion result on each carrier, an available resource determining module, configured to carry out resource exclusion procedure on the resources according to a sensing result to obtain an available resource set after resources on the candidate carrier are set to be available, and a transmission resource determining module, configured to select the transmission resources from the available resource set and set an SPS counter used for carrying out resource scheduling.

The application has the following beneficial effects:

compared with an existing single carrier resource selection mechanism, the application aims at the problems that receiving opportunities are lost and system performance is affected since more obvious half-duplex influences are caused when business is transmitted on multiple carriers after carrier aggregation is introduced. In a technical solution provided by the embodiment of the application, when a situation of power distribution while multiple carriers simultaneously transmission the business is considered, due to resource selection which aims at a plurality of segmented service packets from the same service packet, the same SPS counter is arranged to guarantee that the resource reselection opportunities of the segmented service packets are kept consistent, so that a resource selection solution capable of reducing a half-duplex influence, reducing a receiving opportunity lost influence and lowering a skip subframe amount is provided, and meanwhile, a problem that power distribution is serious since a plurality of service packets are simultaneously transmitted is avoided.

BRIEF DESCRIPTION OF THE DRAWINGS

The drawing stated here is used for providing the further comprehension of the application and forming one part of the application, and the schematic embodiment and the explanation thereof of the application are used for explaining the application but do not form improper restriction for the application.

DETAILED DESCRIPTION OF THE EMBODIMENTS

In an invention process, the inventor pays attention to that:

In the 3GPPAN #74 conference, the introduction of carrier aggregation into V2X is determined;

V2X carrier aggregation supports two multiple-carrier service packet transmission scenes: the first scene: mutually independent service packets are respectively transmitted on different carriers; and the second scene: segmented service packets from the same service packet are respectively transmitted on different carriers.

Figure 1:
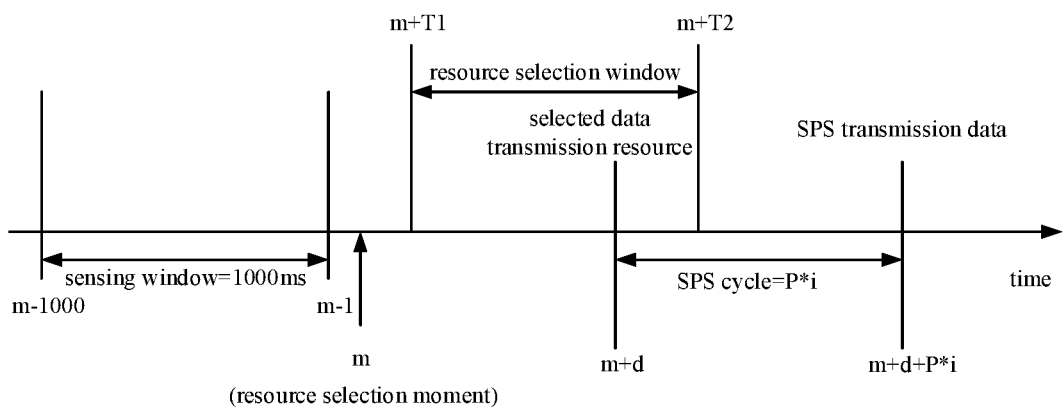
FIG. 1 is a resource distribution time sequence schematic diagram in the related art.
Figure 2:
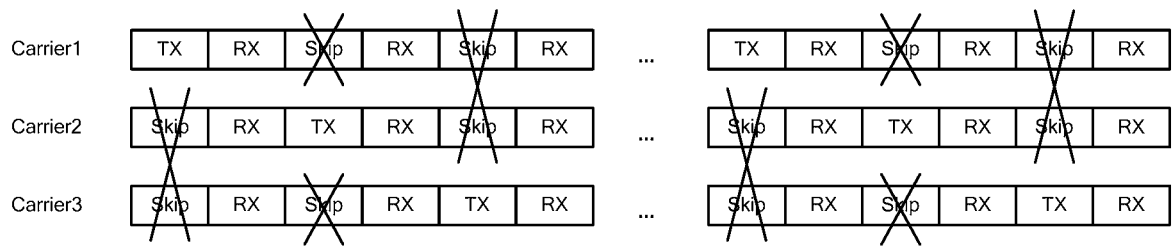
FIG. 2 is a skip subframe distribution schematic diagram in the embodiment of the application.

FIG. 2 is the skip subframe distribution schematic diagram. As shown in FIG. 2, according to the above two scenes, if the carrier aggregation is carried out on PC5 carriers of adjacent frequency bands, system reliability may be affected due to a reason of half duplex, i.e., UE executes transmission on a certain carrier of an adjacent frequency band but cannot receive the service packet on other carriers. In a resource selection process, such subframes in a sensing window are called skip subframes, and resources which correspond to the corresponding subframes in the resource selection window cannot be used as candidate resources.

Therefore, under a situation of multiple carriers, since business is transmitted on the multiple carriers, half duplex causes that receiving opportunities on the skip subframes are given up to influence system performance, and the influence is obviously higher than the influence of a single carrier situation.

On the other hand, if the UE transmits the business on one carrier, allowable maximum transmission power can be used, but if the UE transmits multiple pieces of business on different carriers on the same subframe, such as MAC PDU (Medium Access Control, Protocol Data Unit), the maximum transmission power needs to be shared. Therefore, for each transmission, the transmission power is lowered to a certain degree, and how to reasonably select the transmission resources on the multiple carriers to realize the combined consideration of the reduction of a half-duplex influence and the avoidance of the influence of the reliability caused by obvious reduction of the transmission power is a technical problem which needs to be solved. On the basis, the embodiment of the application provides a resource selection solution under multiple carriers, and the specific implementation ways of the application are illustrated below with reference to the drawings.

Figure 3:
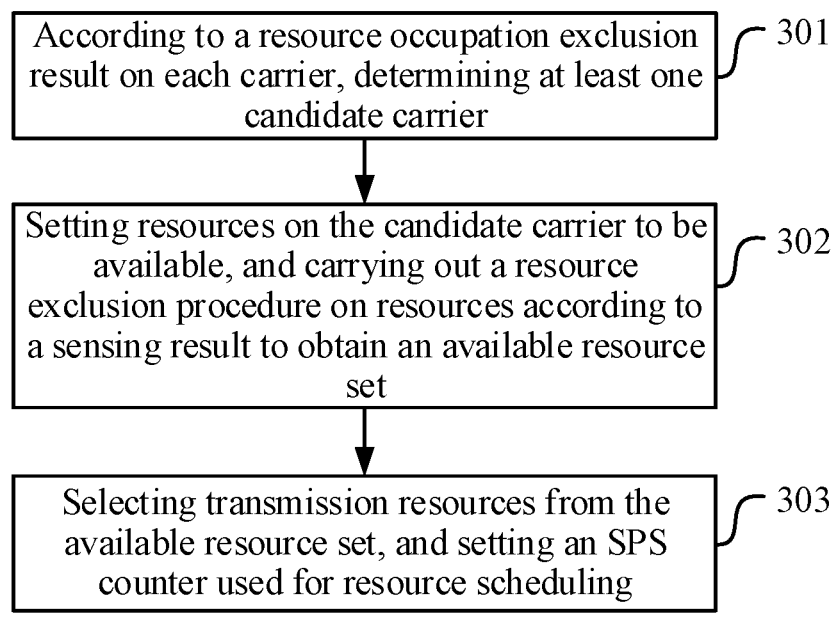
FIG. 3 is a flow schematic diagram of implementation of a resource selection method under multiple carriers in the embodiment of the application.

FIG. 3 is the flow schematic diagram of implementation of the resource selection method under multiple carriers. As shown in FIG. 3, the method can include the following steps.

S301, determining at least one candidate carrier according to a resource occupation exclusion result on each carrier.

Specifically, according to at least one factor including business attributes, business priorities, carrier loads and a resource occupation exclusion result on each carrier in an available carrier set, selecting and determining the candidate carrier (set).

S302, after resources on the candidate carrier are set to be available, according to a sensing result, carrying out resource exclusion procedure on the resources to obtain an available resource set.

Specifically, after candidate resources on candidate carriers (sets) are set to be available, according to the sensing result, carrying out the following operations:

determining the candidate resource corresponding to the skip subframe, and/or excluding the reserved resources corresponding to the occupied resource; and determining an available resource set or available subframe set which meets ratio requirements, wherein the exclusion of the resources can be independently executed on a certain single carrier or subjected to combined execution on multiple carriers.

S303, selecting the transmission resource in the available resource set, and setting the SPS counter used for resource scheduling.

Optionally, the selection of the transmission resource from the available resource set is carried out as follows: the S-RSSI is sorted, and the transmission resource is selected from the available resource subset with lower S-RSSI.

Specifically, in a residual available resource set after resource exclusion procedure on the resources, S-RSSI power sorting is carried out, and in the available resource subset with lower S-RSSI power, the transmission resource is selected on few subframes when a situation that the service packet transmission power is not lower than minimum reliable power is met; or in the residual available resource set after resource exclusion procedure on the resources, S-RSSI power sorting is carried out, and in the available subframe subset with lower S-RSSI power, the transmission resource is selected on few subframes when a situation that the service packet transmission power is not lower than the minimum reliable power is met.

Then, after the resource selection is finished, the SPS counter for resource scheduling is set.

Optionally, the resources are carried out by taking subframes or short subframes as a time domain resource unit.

Namely, the subframe mentioned for illustration and indication in the specific embodiments also can be replaced with other time domain resource units, including short subframes and the like.

The specific implementation of each step is explained below.

S302 of excluding according to the sensing result to obtain the available resource set optionally can include the following two ways:

the first way is that:

on the candidate carrier, the candidate resource corresponding to the skip subframe is excluded; and/or, on the candidate carrier, the reserved resources corresponding to the occupied resources are respectively excluded;

after resource exclusion procedure on the resources, calculation is carried out according to the size of each service packet to obtain the ratio of residual resources, and if the ratio does not completely achieve or is not higher than a configured ratio threshold value, an exclusion procedure is executed again after a received power threshold value is added with a preset value each time until the ratio, which is calculated according to the size of each service packet, of residual resources achieves or is higher than the configured ratio threshold value after resource exclusion procedure on the resources; and the available resource obtained when the ratio completely achieves or is higher than the configured ratio threshold value is taken as the available resource set.

Specifically, after resource exclusion is carried out in a combination manner on multiple carriers, the available resource set which meets the ratio requirements can be determined according to the following way:

1) on the candidate carriers, the candidate resource corresponding to the skip subframe is excluded; and/or 2) on the candidate carriers, the reserved resources corresponding to the occupied resources are respectively excluded; and during specific implementation, when the candidate resource corresponding to the skip subframe is excluded, an existing mechanism can be adopted to exclude the candidate resource corresponding to the skip subframe.

after exclusion implemented in 1) and 2) is carried out, the ratio of residual resources is calculated according to the size of each service packet, if the ratio does not completely achieve or is not higher than a (pre-) configured ratio threshold value, a PSSCH-RSRP threshold value is increased by 3 dB (the received power is set as the PSSCH-RSRP threshold value according to an existing customary implementation way, and the added preset value is set as 3 dB), and the exclusion procedure is executed again until the ratio, which is calculated respectively according to the size of each service packet, of residual resources achieves or is higher than the (pre-) configured ratio threshold value.

The second way is that:

on the candidate carrier, the candidate resource corresponding to the skip subframe is excluded; and/or, on the candidate carrier, the reserved resources corresponding to the occupied resources are respectively excluded;

after resource exclusion procedure on the resources is carried out, the number of available subframes is determined, if the number of the available subframes or a ratio of the available subframes in candidate resource subframes does not achieve or is not higher than the configured number threshold value or the ratio threshold value, the exclusion procedure is executed again after the received power threshold value is added with a preset value each time until the number of the available subframes or the ratio of the available subframe in the candidate resource subframes achieves or is higher than a configured number threshold value or ratio threshold value after resource exclusion procedure on the resources, wherein the available subframes can simultaneously transmit the service packets; and the available resources obtained when the number of the available subframes or the ratio of the available subframe in the candidate resource subframes achieves or is higher than the configured number threshold value or ratio threshold value are taken as the available resource set.

Specifically, after resource exclusion is carried out in a combination manner on multiple carriers, the available resource set which meets the ratio requirements can be determined according to the following way:

1) on the candidate carriers, the candidate resource corresponding to the skip subframe is excluded; and/or 2) on the candidate carriers, the reserved resources corresponding to the occupied resources are respectively excluded; and during specific implementation, when the candidate resource corresponding to the skip subframe is excluded, an existing mechanism can be adopted to exclude the candidate resource corresponding to the skip subframe.

After exclusion is implemented by 1) and 2), calculation is implemented to determine the number of subframes which can simultaneously transmit the service packets, and the subframes are defined as available subframes; if the number of the available subframes or the ratio of the available subframe in candidate resource subframes does not achieve or is not higher than a (pre-) configured number threshold value or a ratio threshold value, a PSSCH-RSRP threshold value is increased by 3 dB (the received power is set as the PSSCH-RSRP threshold value according to an existing customary implementation way, and the added preset value is set as 3 dB), and the exclusion procedure is executed again until the number of the available subframes or the ratio of the available subframe in the candidate resource subframes achieves or is higher than the (pre-) configured number threshold value or the ratio threshold value.

In S303, for selecting the transmission resources in the available resource set, optionally, the embodiment of the application provides three ways which are respectively explained below.

Optionally, various configurations, including available resources having the lowest power and achieving the configuration ratio, configured reliable transmission power, a configured reliable transmission power threshold value, a configured maximum quantity of transmission and the like, are involved. It's easy to understand that configuration can be from ways, including pre-configuration and/or high-level instruction configuration and the like. Since the embodiment of the application only relates to configuration and does not need to pay attention to a configuration way, a pre-configuration way is mainly used for explanation, and a (pre-) configuration expression way is adopted in order to prevent expression from being only limited to the (pre-) configuration way.

The first way is that:
on each candidate carrier, S-RSSI power sorting is carried out in the available resource set, and the available resource which has the lowest power and achieves the configuration ratio is selected as an available resource subset;

according to the order, the available transmission resource is selected for each transmission service packet in sequence; and the transmission resource is independently selected for each service packet from the available transmission resource.

The second way is that:
on each candidate carrier, the S-RSSI power sorting is carried out in the available resource set, and the available resource which has the lowest power and achieves the configuration ratio is selected as an available resource subset;

according to the order, the available transmission resource is selected for each transmission service packet in sequence; and after the transmission resource is selected for the first transmission service packet from the available resources, the transmission resource is selected for other service packets from the available transmission resources.

The first implementation way and the second implementation way can be as follows:

optionally, a step of independently selecting transmission resources for each service packet from the available transmission resources can include:

in the available resource subset, determining a maximum quantity of transmission allowed on the same subframe when the transmission power is not lower than configured reliable transmission power according to a configured maximum quantity of transmission or according to calculation;

determining available resources overlapped with other service packets transmitted by the same UE on a time domain, and marking the determined available resources as a preferentially selected resource subset;

randomly selecting the transmission resources from the preferentially selected resource subset, wherein the transmission resources are resources on which the available transmission power is lower than or equal to the configured reliable transmission power threshold value or the quantity of transmission in the same subframe does not exceed the configured maximum quantity of transmission in the same subframe, after the available transmission power or the quantity of transmission in the same subframe is calculated according to a total quantity of retransmission on the subframe where the transmission resources are located;

with the selected transmission resources, selecting retransmission resources from the preferentially selected resource subset under a condition that the restriction of retransmission resource selection for same service packet is met; and determining the transmission resource from the retransmission resources, wherein the available transmission power on the resource is lower than the configured reliable transmission power threshold value, or the quantity of transmission on the resource is greater than the configured maximum quantity of transmission.

Optionally, a step of randomly selecting the transmission resource from the preferentially selected resource subset also can further include:

if the quantity of selection achieves a configured quantity threshold value, randomly selecting the transmission resource from the available resource subsets except the preferentially selected resource subset.

Optionally, when the retransmission resource is selected, the step further includes:

if the quantity of selection achieves the configured quantity threshold value in a process that the transmission resource is determined from the retransmission resource, randomly selecting the retransmission resource from the available resource subset except the preferentially selected resource subset.

Optionally, the restriction of retransmission resource selection for same service packet is that initial retransmission is not carried out in the same subframe and a time interval is smaller than a certain threshold value.

Optionally, when the transmission resource is selected for each transmission service packet in sequence according to an order, the order is determined according to the magnitude of frequency domain resources occupied by the transmission service packet and/or a carrier number corresponding to the transmission service packet.

The above implementation way is explained through specific embodiments of the following first way and second way.

Two ways, including the first way "the selection of transmission resources for each service packet from the available transmission resources" and the second way "the selection of transmission resources for other service packets from the available transmission resources after the transmission resource is selected for the first transmission service packet from the available transmission resources", are respectively explained by the embodiments.

The first way is that the transmission resources are respectively selected for each service packet from the available transmission resources.

In the residual available resource set after resource exclusion procedure on the resources, S-RSSI power sorting is carried out, and the transmission resource is selected from the available resource subset with the lower S-RSSI power by focusing on few subframes when a situation that the service packet transmission power is not lower than the minimum reliable power is met, and in the embodiment, it is considered that resources selected by the UE are other process resources which are already transmitted at present:

1) on each candidate carrier, S-RSSI power sorting is carried out in the residual available resource subset obtained after resource exclusion procedure on the resources is carried out to select the available resource subset which has the lowest power and has a preset certain ratio; and 2) resources capable of carrying out business transmission are selected in sequence from the available resource subset with the lowest power, and specifically the following way is carried out:

A) when the reliable transmission power which is not lower than the (pre-) configured reliable transmission is obtained according to (pre-) configuration or calculation, determining the allowable maximum quantity of transmission on the same subframe;

B) according to a certain order, selecting the transmission resource for each transmission service packet in sequence, wherein the order can be the magnitude of frequency domain resources occupied by the transmission business, and an ascending order or a descending order of the carrier numbers corresponding to the service packets;

C) respectively selecting resources for each service packet, and respectively executing the following steps:

C1) determining available resources overlapped with other service packets transmitted by the same UE on a time domain, wherein the available resources include the service packet irrelevant to current resource selection and the service packet which is related to the current resource selection and has selected resource selection, and the available resources can be marked as the preferentially selected resource subset during implementation;

C2) randomly selecting one transmission resource;

C3) according to a total quantity of retransmission on the subframe where the transmission resource is positioned, calculating available transmission power or the quantity of transmission in the same subframe, if the available transmission power is lower than the (pre-) configured reliable transmission power threshold value or the quantity of transmission in the same subframe exceeds the (pre-) configured maximum quantity of transmission in the same subframe, executing the C2 again, and otherwise, executing C4; and if a quantity of returning to the C2 to execute the C2 again achieves the (pre-) configured quantity threshold value, randomly selecting one transmission resource from the available resource subset except the preferentially selected resource subset, and executing the C4;

C4) according to the selected transmission resource, under a condition that restriction of retransmission resource selection for same service packet is met, retransmission resources are selected from the preferentially selected resource subset, wherein the restriction of retransmission resource selection for same service packet can be that the initial retransmission is not carried out in the same subframe and a time interval is smaller than the certain threshold value;

C5) according to the retransmission resources selected in the C4 and the a total quantity of retransmission on the subframe where the transmission resource is positioned, calculating the available transmission power; and C6) if the available transmission power is lower than the reliable transmission power threshold value, executing the C5 again; and if the execution quantity of the C5 achieves the (pre-) configured quantity threshold value, selecting one retransmission resource which meets the restriction of retransmission resource selection for same service packet from the available resource subsets except the preferentially selected resource subset. If the (pre-) configured quantity of retransmission is greater than or equal to one time, repeatedly executing the C4 to the C6 until the transmission resource which meets the quantity of retransmission is selected;

D) In a (pre-) configured SPS counter range, randomly selecting the SPS counter to serve as the SPS counter of service packets for the current resource selection.

The implementation of the C1 to the C6 is explained below by the flow diagram.

Figure 4:
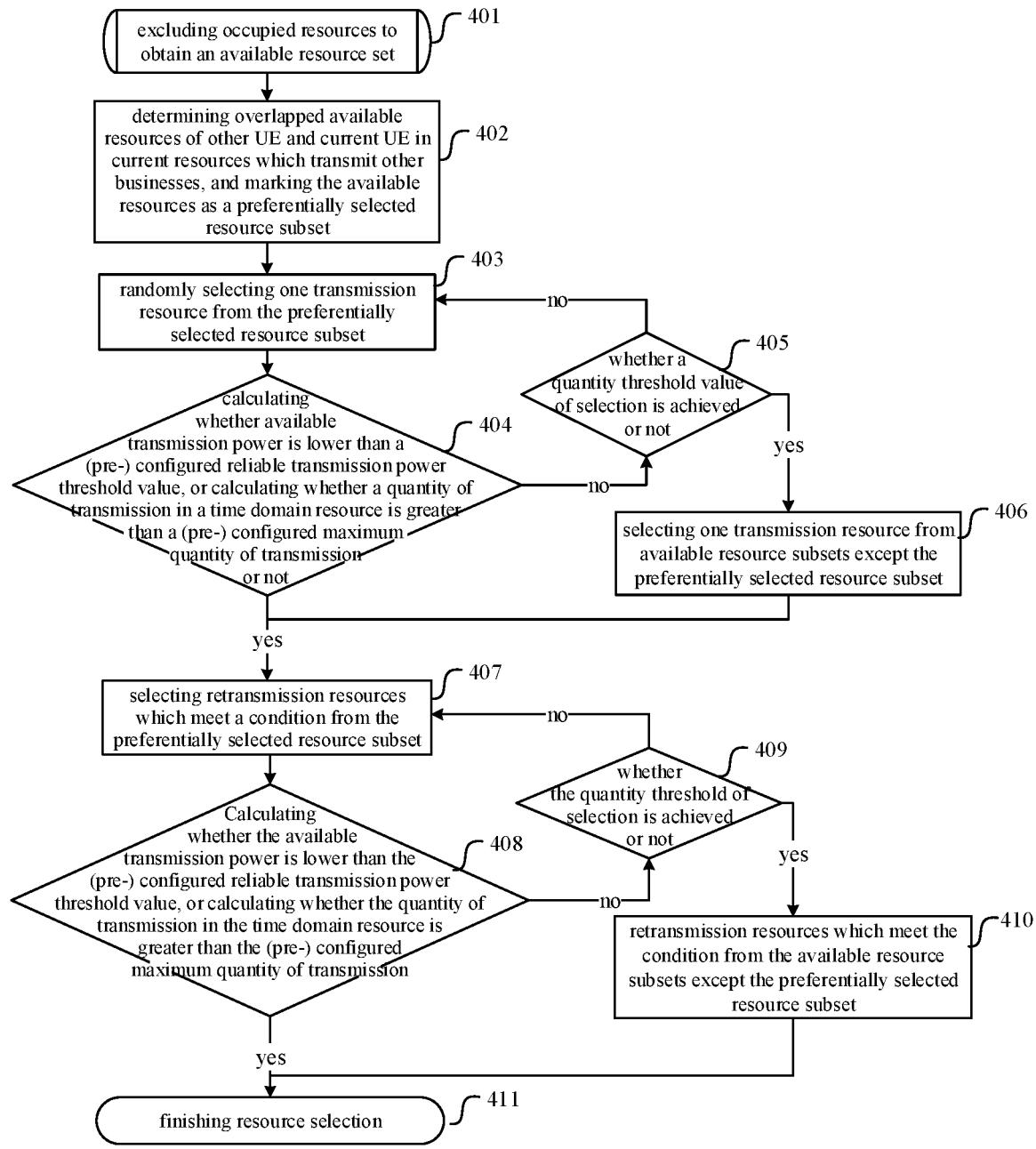
FIG. 4 is a flow schematic diagram of implementation of resource distribution in the embodiment of the application.

FIG. 4 is the flow schematic diagram of implementation of resource distribution, and the flow schematic diagram is used for explaining the flow of the C1 to the C6. As shown in FIG. 4, the following flows can be included:

S401: obtaining the available resource set after occupied resources are excluded;

S402: determining the available resources, which are overlapped on the time domain, of other UE and the current UE in the current resource which transmits other business, and marking the available resources as a preferentially selected resource subset;

S403: randomly selecting one transmission resource from the preferentially selected resource subset;

S404: calculating whether the available transmission power is lower than the (pre-) configured reliable transmission power threshold value, or the quantity of transmission in the time domain resource is greater than the (pre-) configured maximum quantity of transmission or not, executing S407 if the available transmission power is lower than the (pre-) configured reliable transmission power threshold value, or the quantity of transmission in the time domain resource is greater than the (pre-) configured maximum quantity of transmission, and otherwise, executing S405;

S405: judging whether a quantity threshold value of selection is achieved or not, executing S406 if the quantity threshold value of selection is achieved, and otherwise, executing S403;

S406: selecting one transmission resource in the available resource subsets except the preferentially selected resource subset, and executing S407;

S407: selecting retransmission resources which meet a condition in the preferentially selected resource subset;

S408: calculating whether the available transmission power is lower than the (pre-) configured reliable transmission power threshold value, or the quantity of transmission in the time domain resource is greater than the (pre-) configured maximum quantity of transmission or not, executing S411 if the available transmission power is lower than the (pre-) configured reliable transmission power threshold value or the quantity of transmission in the time domain resource is greater than the (pre-) configured maximum quantity of transmission, and otherwise, executing S409;

S409: judging whether the quantity threshold value of selection is achieved or not, executing S410 if the quantity threshold value of selection is achieved, and otherwise, executing S407;

S410: selecting retransmission resources which meet a condition in the available resource subsets except the preferentially selected resource subset, and executing S411; and S411: finishing resource selection.

The second way is that transmission resources are respectively selected for other service packets from the available transmission resources after the transmission resource is selected for the first transmission service packet from the available transmission resources.

In the residual available resource set after resource exclusion procedure on the resources, S-RSSI power sorting is carried out, and the transmission resource is selected from the available resource subset with the lower S-RSSI power by focusing on few subframes when a situation that the service packet transmission power is not lower than the minimum reliable power is met, and the embodiment does not consider that resources selected by the UE are other process resources which are transmitted at present:

1) on each candidate carrier, carrying out S-RSSI power sorting in the residual available resource set after resource exclusion procedure on the resources, and selecting an available resource subset which has the lowest power and a preset certain ratio; and 2) selecting resources which transmit business in sequence from the available resource subset with the lowest power, and the step specifically includes the following way that:

A) when a situation that transmission power is not lower than the (pre-) configured reliable transmission power is met according to (pre-) configuration or calculation, the allowable maximum quantity of transmission on the same subframe is determined;

B) according to the certain order, the transmission resource is selected for each transmission business in sequence, wherein the order can be the magnitude of frequency domain resources occupied by the transmission business, and the ascending order or the descending order of the carrier numbers corresponding to the service packets;

C) firstly, resources are selected for the first transmission service packet, and the transmission resource which meets the quantity of transmission and the initial retransmission restriction is selected from the available resource subset; and firstly, the resources are selected for the first transmission service packet because resources occupied by other business transmitted at present are not considered when the resources are selected for the first transmission service packet, and in the first way, other resources which are transmitted at present do not need to be considered;

D) resources are respectively selected for other service packets, and the following steps are respectively executed:

D1) in a UE current resource selection process, marking the available resources, which are overlapped with resources selected by other service packets on the time domain, as the preferentially selected resource subset;

D2) randomly selecting one transmission resource;

D3) according to a total quantity of retransmission on the subframe where the transmission resource is positioned, calculating available transmission power or the quantity of transmission in the same subframe, if the available transmission power is lower than the (pre-) configured reliable transmission power threshold value or the quantity of transmission in the same subframe exceeds the (pre-) configured maximum quantity of transmission in the same subframe, executing the D2 again, and otherwise, executing D4; and if a quantity of returning to the D2 to execute the D2 again achieves the (pre-) configured quantity threshold value, randomly selecting one transmission resource from the available resource subsets except the preferentially selected resource subset, and executing the D4;

D4) according to the selected transmission resource, under a condition that restriction of retransmission resource selection for same service packet is met, selecting retransmission resources from the preferentially selected resource subset, wherein the restriction of retransmission resource selection for same service packet can be that the initial retransmission is not carried out in the same subframe and a time interval is smaller than a certain threshold value;

D5) according to the retransmission resources selected in the D4 and the a total quantity of retransmission on the subframe where the transmission resource is positioned, calculating the available transmission power; and D6) if the available transmission power is lower than the reliable transmission power threshold value, executing the D5 again; if the execution quantity of the D5 achieves the (pre-) configured quantity threshold value, selecting one retransmission resource which meets the restriction of retransmission resource selection for same service packet from the available resource subsets except the preferentially selected resource subset. If the (pre-) configured quantity of retransmission is greater than or equal to one time, repeatedly executing the D4 to the D6 until the transmission resource which meets the quantity of retransmission is selected; and E) in a (pre-) configured SPS counter range, the SPS counter is randomly selected to serve as the SPS counter of the service packets for the current resource selection.

The third way is that:

a step of selecting the transmission resource from the available resource set includes the following steps:

on each candidate carrier, carrying out S-RSSI power sorting in the available resource set, and selecting the available resource which has the lowest power and achieves a configuration ratio as an available resource subset;

according to an order, selecting the available transmission resources for each transmission service packet in sequence;

selecting a subframe which meets the quantity of retransmission and initial retransmission transmission resource restriction for the first transmission service packet from the available transmission resources, and selecting the transmission resource for the first transmission service packet on the selected subframe; and respectively selecting transmission resources for other service packets from the available transmission resources.

Optionally, a step of selecting the transmission resources for other service packets from the available transmission resources includes the following steps:

on the available subframe on which the resources are selected for the previous service packet, distributing the transmission resource to the current service packet; and when a situation that transmission power is not lower than the configured reliable transmission power is met according to configuration or calculation, determining the allowable maximum quantity of transmission on the same subframe, and if the quantity of transmission on the subframe for the current resource distribution exceeds the restriction of a maximum quantity of transmission, selecting other available subframes which are not selected for the current service packet to distribute the transmission resources.

The embodiments are used for explanation below.

In the residual available resource set after resource exclusion procedure on the resources, S-RSSI power sorting is carried out, and the transmission resource is selected from the available resource subset with the lower S-RSSI power by focusing on few subframes when a situation that the service packet transmission power is not lower than the minimum reliable power is met:

1) on each candidate carrier, S-RSSI power sorting is carried out in the residual available subframe set after resource exclusion procedure on the resources, and an available subframe subset with the lowest power and a preset certain ratio is selected, wherein S-RSSI power sorting can be the RSSI linear mean value of the residual resources (component channel) on the subframe; and 2) in the available subframe subset with the lowest power and the preset certain ratio, the transmission resource is distributed for each transmission service packet in sequence according to an order, wherein the order can be the magnitude of frequency domain resources occupied by the transmission service packet, and an ascending order or a descending order of the carrier numbers corresponding to the service packets, and the specific step can include:

A) randomly selecting the subframe which meets the quantity of retransmission and initial retransmission transmission resource restriction for the first transmission service packet, and selecting the transmission resource for the first transmission service packet on the selected subframe;

B) selecting the transmission resources for other service packets according to the following ways:

B1) on the available subframe where the resource is selected for the previous service packet, distributing the transmission resource to the current service packet; and B2) when a situation that transmission power is not lower than the configured reliable transmission power is met according to (pre-) configuration or calculation, determining the allowable maximum quantity of transmission on the same subframe, and if the quantity of transmission on the subframe for the current resource distribution exceeds maximum quantity of transmission restriction, selecting other available subframes which are not selected for the current service packet to distribute the transmission resources; and C) in a (pre-) configured SPS counter range, randomly selecting the SPS counter to serve as the SPS counter of the service packets for current resource selection.

Optionally, when the transmission power is not lower than the (pre-) configured reliable transmission power, the allowable maximum quantity of transmission on the same subframe can be determined according to the following way.

$$N = \left\lceil \frac{10^{(\frac{P_{cMAX}}{10})}}{10^{(\frac{P_{aMIN}}{10})}} \right\rceil,$$

wherein N is the allowable maximum quantity of transmission on the same subframe when the transmission power is not lower than the (pre-) configured reliable transmission power, $P_{cMAX}$ (dBm) is V2X UE maximum transmission power, and $P_{aMIN}$ (dBm) is the configured reliable transmission power.

In the specific implementation, such as in the above three ways, when the transmission power is not lower than the (pre-) configured reliable transmission power, the calculation way of the allowable maximum quantity of transmission on the same subframe can be as follows:

the V2X UE maximum transmission power is $P_{cMAX}$ (dBm), and the (pre-) configured reliable transmission power is $P_{aMIN}$ (dBm); and when the transmission power is not lower than the (pre-) configured reliable transmission power, the calculation way of the allowable maximum quantity of transmission on the same subframe is marked as N, wherein $$N = \left\lceil \frac{10^{(\frac{P_{cMAX}}{10})}}{10^{(\frac{P_{aMIN}}{10})}} \right\rceil.$$

Optionally, when a plurality of service packets are transmitted in the same subframe, the transmission power of each service packet can be determined according to the following way.

$$P_a = 10 * 10\log\left[\frac{10^{(\frac{P_{cMAX}}{10})}}{N}\right],$$

wherein $P_{cMAX}$ (dBm) is V2X UE maximum transmission power, $P_{aMIN}$ (dBm) is the configured reliable transmission power, N is the quantity of transmission on the same subframe when the transmission power is not lower than the (pre-) configured reliable transmission power, $P_a$ is the available transmission power of each service packet, and $P_a$ meets $P_a \geq P_{aMIN}$.

In the specific implementation, such as in the above three ways, when a plurality of service packets are transmitted in the same subframe, the calculation way and the rule of the transmission power of each service packet can be as follows:

the V2X UE maximum transmission power is $P_{cMAX}$ (dBm), and the (pre-) configured reliable transmission power is $P_{aMIN}$ (dBm), and when the transmission power is not lower than the (pre-) configured reliable transmission power, the quantity of transmission on the same subframe is marked as N; and the available transmission power of each service packet is marked as $P_a$, and $$P_a = 10 * 10\log\left[\frac{10^{(\frac{P_{cMAX}}{10})}}{N}\right],$$

wherein

Pa meets $P_a \geq P_{aMIN}$.

On the basis of the same inventive concept, the embodiment of the application also provides a resource selection device under multiple carriers, a computer device and a storage medium. Since principles for the devices to solve problems are similar to the resource selection method under multiple carriers, the implementation of the devices can refer to the implementation of the method, and unnecessary details are not given to the repeated parts.

The computer device provided in the embodiment of the application includes a memory, a processor and a computer program which is stored in the memory and can be operated on the processor, and when the processor executes the computer program, the resource selection under multiple carriers is realized according to the following method:

determining at least one candidate carrier according to a resource occupation exclusion resource on each carrier;

after resources on the candidate carriers are set to be available, carrying out resource exclusion procedure on the resources according to a sensing result to obtain an available resource set; and selecting transmission resources in the available resource set, and arranging an SPS counter used for carrying out resource scheduling.

Optionally, the selection of transmission resources from the available resource set is that S-RSSI is sorted, and the transmission resources are selected from the available resource set with lower S-RSSI.

Optionally, a step of obtaining the available resource set after resource exclusion procedure on the resources according to the sensing result includes:

on the candidate carrier, excluding the candidate resource corresponding to a skip subframe; and/or, on the candidate carrier, respectively excluding reserved resources corresponding to occupied resources;

after resource exclusion procedure on the resources is carried out, calculating to obtain a ratio of residual resources according to the size of each service packet respectively, and if the ratio does not completely achieve or is not higher than a configured ratio threshold value, executing an exclusion procedure again after a received power threshold value is added with a preset value each time until the ratio, which is calculated according to the size of each service packet, of the residual resources completely achieves or is higher than the configured ratio threshold value after resource exclusion procedure on the resources;

and taking the available resources obtained when the ratio completely achieves or is higher than the configured ratio threshold value as the available resource set.

Optionally, a step of carrying out resource exclusion procedure on the resources according to the sensing result to the available resource set includes:

on the candidate carrier, excluding the candidate resource corresponding to the skip subframe; and/or, on the candidate carrier, respectively excluding the reserved resources corresponding to the occupied resources;

after resource exclusion procedure on the resources is carried out, determining the number of available subframes, and if the number of the available subframes or a ratio of the available subframes in candidate resource subframes does not achieve or is not higher than a configured number threshold value or ratio threshold value, executing the exclusion procedure again after the received power threshold value is added with a preset value each time until the number of the available subframes or the ratio of the available subframes in the candidate resource subframes achieves or is higher than the configured number threshold value or the ratio threshold value after resource exclusion procedure on the resources, wherein the available subframes can simultaneously transmit the service packets; and taking the available resources obtained when the number of the available subframes or the ratio of the available subframes in the candidate resource subframes achieves or is higher than the configured number threshold value or the ratio threshold value as the available resource set.

Optionally, a step of selecting transmission resources from the available resource set includes:

on each candidate carrier, carrying out S-RSSI power sorting in the available resource set, and selecting available resources which have the lowest power and achieve a configuration ratio as an available resource subset;

according to an order, selecting available transmission resources for each transmission service packet in sequence; and respectively selecting transmission resources for each service packet from the available transmission resources, or selecting transmission resources for other service packets from the available transmission resources after the transmission resource is selected for the first transmission service packet from the available transmission resources.

Optionally, a step of selecting the transmission resource for each service packet from the available transmission resources includes:

in the available resource subset, determining a maximum quantity of transmission allowed on the same subframe when the transmission power is not lower than configured reliable transmission power according to a configured maximum quantity of transmission or according to calculation;

determining available resources overlapped with other service packets transmitted by same UE on a time domain, and marking the available resources as a preferentially selected resource subset;

randomly selecting the transmission resources from the preferentially selected resource subset, wherein the transmission resources are resources on which the available transmission power is lower than or equal to the configured reliable transmission power threshold value or the quantity of transmission in the same subframe does not exceed the configured maximum quantity of transmission in the same subframe, after the available transmission power or the quantity of transmission in the same subframe is calculated according to a total quantity of retransmission on the subframe where the transmission resources are located;

with the selected transmission resources, selecting retransmission resources from the preferentially selected resource subset under a condition that the restriction of retransmission resource selection for same service packet is met; and determining the transmission resource from the retransmission resources, wherein the available transmission power on the resource is lower than the configured reliable transmission power threshold value, or the quantity of transmission on the resource is greater than the configured maximum quantity of transmission.

Optionally, when the transmission resource is randomly selected from the preferentially selected resource subset, the step further includes:

if the quantity of selection achieves a configured quantity threshold value, randomly selecting the transmission resource from the available resource subsets except the preferentially selected resource subset.

Optionally, when the retransmission resource is selected, the step further includes:

if the quantity of selection achieves the configured quantity threshold value in a process of determining the transmission resource from the retransmission resource, randomly selecting the retransmission resource from the available resource subsets except the preferentially selected resource subset.

Optionally, when the transmission resource is selected for each transmission service packet in sequence according to an order, the order is determined according to the magnitude of frequency domain resources occupied by the transmission service packet and/or a carrier number corresponding to the transmission service packet.

Optionally, a step of selecting the transmission resource in the available resource set includes:

on each candidate carrier, carrying out S-RSSI power sorting in the available resource set, and selecting the available resource which has the lowest power and achieves the configuration ratio as the available resource subset;

according to the order, selecting the available transmission resource for each transmission service packet in sequence;

selecting a subframe which meets the quantity of retransmission and initial retransmission transmission resource restriction for the first transmission service packet from the available transmission resources, and selecting the transmission resource for the first transmission service packet on the selected subframe; and respectively selecting transmission resources for other service packets from the available transmission resources.

Optionally, a step of respectively selecting the transmission resources for the other service packets from the available transmission resources includes:

distributing the transmission resource to the current service packet on the available subframe on which the resources are selected for the previous service packet; and when a situation that transmission power is not lower than the configured reliable transmission power is met according to configuration or calculation, determining the allowable maximum quantity of transmission on the same subframe, and if the quantity of transmission on the subframe for the current resource distribution exceeds the restriction of a maximum quantity of transmission, selecting other available subframes which are not selected for the current service packet to distribute the transmission resources.

Optionally, the S-RSSI power sorting used for sorting is the RSSI linear mean value of the residual resources on the subframe.

Optionally, the arrangement of the SPS counter used for resource scheduling is that the SPS counter is randomly selected in a configured SPS counter range to be served as the SPS counter of the service packets for current resource selection.

The technical solution provided by the embodiment of the application can be implemented according to the following ways.

The embodiment of the application provides a computer readable storage medium which stores the computer program capable of executing the resource selection method under multiple carriers, and specifically, the method includes the following steps:

determining at least one candidate carrier according to a resource occupation exclusion result on each carrier;

after resources on the candidate carrier are set to be available, carrying out resource exclusion procedure on the resources according to a sensing result to obtain an available resource set; and selecting transmission resources from the available resource set, and arranging an SPS counter for resource scheduling.

Optionally, the selection of the transmission resources from the available resource set is that S-RSSI is sorted, and the transmission resources are selected from the available resource set with lower S-RSSI.

Optionally, a step of obtaining the available resource set after resource exclusion procedure on the resources according to the sensing result includes:

on the candidate carrier, excluding the candidate resource corresponding to a skip subframe; and/or, on the candidate carrier, respectively excluding reserved resources corresponding to occupied resources;

after resource exclusion procedure on the resources is carried out, calculating to obtain a ratio of residual resources respectively according to the size of each service packet, and if the ratio does not completely achieve or is not higher than a configured ratio threshold value, executing an exclusion procedure again after a received power threshold value is added with a preset value each time until the ratio, which is calculated according to the size of each service packet, of the residual resources completely achieves or is higher than the configured ratio threshold value after resource exclusion procedure on the resources; and taking the available resources obtained when the ratio completely achieves or is higher than the configured ratio threshold value as the available resource set.

Optionally, a step of obtaining the available resource set after resource exclusion procedure on the resources according to the sensing result includes:

on the candidate carrier, excluding the candidate resource corresponding to the skip subframe; and/or, on the candidate carrier, respectively excluding the reserved resources corresponding to the occupied resources;

after resource exclusion procedure on the resources is carried out, determining the number of available subframes, and if the number of the available subframes or a ratio of the available subframes in candidate resource subframes does not achieve or is not higher than a configured number threshold value or a ratio threshold value, executing the exclusion procedure again after the received power threshold value is added with a preset value each time until the number of the available subframes or the ratio of the available subframes in the candidate resource subframes achieves or is higher than the configured number threshold value or the ratio threshold value after resource exclusion procedure on the resources, wherein the available subframes can simultaneously transmit the service packets; and taking the available resources obtained when the number of the available subframes or the ratio of the available subframes in the candidate resource subframes achieves or is higher than the configured number threshold value or ratio threshold value as the available resource set.

Optionally, a step of selecting the transmission resources from the available resource set includes:

on each candidate carrier, carrying out S-RSSI power sorting in the available resource set, and selecting available resources which have the lowest power and achieve a configuration ratio as the available resource subset;

according to an order, selecting available transmission resources for each transmission service packet in sequence; and respectively selecting transmission resources for each service packet from the available transmission resources, or selecting the transmission resources for other service packets from the available transmission resources after the transmission resource is selected for the first transmission service packet from the available transmission resources.

Optionally, a step of respectively selecting transmission resources for each service packet from the available transmission resources includes that:

in the available resource subset, determining a maximum quantity of transmission allowed on the same subframe when the transmission power is not lower than configured reliable transmission power according to a configured maximum quantity of transmission or according to calculation;

determining available resources overlapped with other service packets transmitted by the same UE on a time domain, and marking the available resources as a preferentially selected resource subset;

randomly selecting the transmission resources from the preferentially selected resource subset, wherein the transmission resources are resources on which the available transmission power is lower than or equal to the configured reliable transmission power threshold value or the quantity of transmission in the same subframe does not exceed the configured maximum quantity of transmission in the same subframe, after the available transmission power or the quantity of transmission in the same subframe is calculated according to a total quantity of retransmission on the subframe where the transmission resources are located;

with the selected transmission resources, selecting retransmission resources from the preferentially selected resource subset under a condition that the restriction of retransmission resource selection for same service packet is met; and determining the transmission resource from the retransmission resources, wherein the available transmission power on the resource is lower than the configured reliable transmission power threshold value, or the quantity of transmission on the resource is greater than the configured maximum quantity of transmission.

Optionally, when the transmission resource is randomly selected from the preferentially selected resource subset, the step further includes:

if the quantity of selection achieves the configured quantity threshold value, randomly selecting the transmission resource from the available resource subsets except the preferentially selected resource subset.

Optionally, when the retransmission resource is selected, the step further includes:

if the quantity of selection achieves the configured quantity threshold value in a process of determining the transmission resource from the retransmission resource, randomly selecting the retransmission resource from the available resource subsets except the preferentially selected resource subset.

Optionally, when the transmission resource is selected for each transmission service packet in sequence according to an order, the order is determined according to the magnitude of frequency domain resources occupied by the transmission service packet and/or a carrier number corresponding to the transmission service packet.

Optionally, a step of selecting the transmission resource from the available resource set includes:

on each candidate carrier, carrying out S-RSSI power sorting in the available resource set, and selecting the available resource which has the lowest power and achieves the configuration ratio as the available resource subset;

according to the order, selecting the available transmission resource for each transmission service packet in sequence;

selecting a subframe which meets the quantity of retransmission and initial retransmission transmission resource restriction for the first transmission service packet from the available transmission resources, and selecting the transmission resource for the first transmission service packet on the selected subframe; and respectively selecting transmission resources for other service packets from the available other service packets resources.

Optionally, a step of respectively selecting the transmission resources for the other service packets from the available transmission resources includes:

distributing the transmission resource to the current service packet on the available subframe where the resources are selected for the previous service packet; and when a situation that transmission power is not lower than the configured reliable transmission power according to configuration or calculation is met, determining the allowable maximum quantity of transmission on the same subframe, and if the quantity of transmission on the subframe for the current distribution resource exceeds the restriction of a maximum quantity of transmission, selecting other available subframes which are not selected for the current service packet to distribute the transmission resources.

Optionally, the S-RSSI power sorting used for sorting is the RSSI linear mean value of the residual resources on the subframe.

Optionally, the arrangement of the SPS counter used for resource scheduling is that the SPS counter is randomly selected in a configured SPS counter range to serve as the SPS counter of the service packets for current resource selection.

Figure 5:
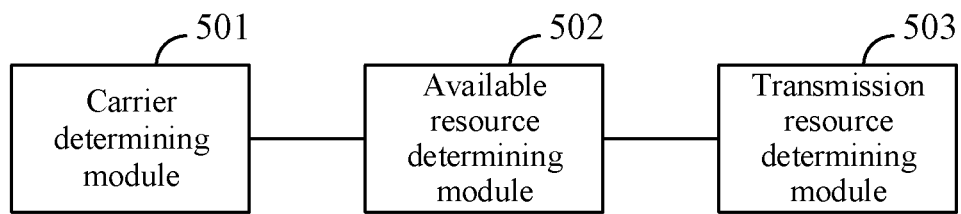
FIG. 5 is a structural schematic diagram of a resource selection device under multiple carriers in the embodiment of the application.

FIG. 5 is the structural schematic diagram of the resource selection device under multiple carriers. As shown in FIG. 5, the device can include:

a carrier determining module 501, used for determining at least one candidate carrier according to a resource occupation exclusion result on each carrier;

an available resource determining module 502, used for obtaining an available resource set after resource exclusion procedure on the resources is carried out according to a sensing result after resources on each candidate carrier are set to be available; and a transmission resource determining module 503, used for selecting transmission resources from the available resource set and arranging an SPS counter used for resource scheduling.

In order to conveniently describe, each part of the above device is independently described by each type of module or unit according to functions. Obviously, when the application is implemented, the function of each module or unit can be implemented in the same or multiple pieces of software or hardware.

In conclusion, compared with an existing single-carrier resource selection mechanism, the application aims at the problems that receiving opportunities are lost and system performance is affected since more obvious half-duplex influences are caused when business is transmitted on multiple carriers after carrier aggregation is introduced. In the technical solutions provided by the embodiment of the application, under the situation that power distribution is carried out while the business is transmitted under multiple carriers, the same SPS counter is arranged for aiming at the resource selection of multiple segmented service packets from the same service packet to guarantee that the resource reselection opportunities of the segmented service packets are kept consistent, so that a resource selection solution capable of reducing a half-duplex influence, reducing a receiving opportunity lost influence and lowering a skip subframe amount is provided, and meanwhile, a problem that power distribution is serious since a plurality of service packets are simultaneously transmitted is avoided.

Those skilled in the art should know that the embodiments of the application can provide the method, the system or the computer program product. Therefore, the application can adopt a form of a complete hardware embodiment, a complete software embodiment or an embodiment capable of combining software with hardware. In addition, the application can adopt a form of the computer program product implemented on one or more computer available storage media (including but not limited to a disc memory, an optical memory and the like) including computer available program codes.

The application is described according to the flow diagram and/or block diagram of the method, the device (system) and the computer program product of the embodiments of the application. It should be understood that each flow and/or block in the flow diagram and/or block diagram and the combination of the flow and/or block in the flow diagram and/or block diagram can be realized through computer program instructions. The computer program instructions can be provided for a general computer, a dedicated computer and an embedded processor or processors of other programmable data processing devices to produce one machine, and therefore, a device used for realizing appointed functions in one flow or multiple flows of the flow diagram and/or one block or multiple blocks of the block diagram is produced through instructions executed by the computer or the processors of the other programmable data processing devices.

The computer program instructions also can be stored in the computer readable memory capable of guiding the computer or the other programmable data processing devices to work in a specific way, so that the instructions stored in the computer readable memory produce products including an instruction device, wherein the instruction device realizes appointed functions in one flow or multiple flows of the flow diagram and/or one block or multiple blocks of the block diagram.

The computer program instructions also can be loaded to the computer or the other programmable data processing devices, so that the computer or the other programmable data processing devices execute one series of operation steps to carry out processing implemented by the computer, and therefore, the instructions executed on the computer or other programmable data processing devices provide a step for realizing an appointed function in one flow or multiple flows of the flow diagram and/or one block or multiple blocks of the block diagram.

Obviously, those skilled in the art can carry out various alterations and modifications on the application without separating from the spirits and range of the application. Therefore, if the alterations and the modifications of the application belong to the ranges of the claims and the equivalent technologies of the application, the application also intends to include the alterations and the modifications.

What is claimed is:

1. A resource selection method under multiple carriers, comprising:
   determining at least one candidate carrier according to a resource occupation exclusion result on each carrier;
   setting resources on the candidate carrier to be available, carrying out a resource exclusion procedure on the resources according to a sensing result to obtain an available resource set; and
   selecting transmission resources from the available resource set, and setting an SPS counter for resource scheduling;
   wherein the setting the SPS counter used for resource scheduling comprises: randomly selecting the SPS counter in a configured SPS counter range to serve as the SPS counter of the service packets for current resource selection.

2. The method according to claim 1, wherein the selecting transmission resources from the available resource set comprises: sorting a Sidelink-Received Signal Strength Indication (S-RSSI), and selecting the transmission resources from the available resource set with lower S-RSSI.

3. The method according to claim 1, wherein the carrying out the resource exclusion procedure on the resources according to the sensing result to obtain the available resource set comprises:
   on the candidate carrier, excluding a candidate resource corresponding to a skip subframe; and/or, on the candidate carrier, respectively excluding reserved resources corresponding to occupied resources;
   after the resource exclusion procedure is carried out, calculating to obtain a ratio of residual resources according to a size of each service packet, and if the ratio does not completely achieve or is not higher than a configured ratio threshold value, executing an exclusion procedure again after a received power threshold value is added with a preset value each time until the ratio completely achieves or is higher than the configured ratio threshold value after the resource exclusion procedure on the resources; and
   taking available resources obtained when the ratio completely achieves or is higher than the configured ratio threshold value as the available resource set,
   or
   the carrying out the resource exclusion procedure on the resources according to the sensing result to obtain the available resource set comprises:
   on the candidate carrier, excluding the candidate resource corresponding to a skip subframe; and/or, on the candidate carrier, respectively excluding reserved resources corresponding to the occupied resources;
   after the resource exclusion procedure on the resources is carried out, determining a quantity of available subframes, and if the quantity of the available subframes or a ratio of the available subframes in candidate resource subframes does not achieve or is not higher than a configured number threshold value or ratio threshold value, executing the exclusion procedure again after the received power threshold value is added with the preset value each time until the quantity of the available subframes or the ratio of the available subframes in the candidate resource subframes achieves or is higher than the configured number threshold value or the ratio threshold value after the resource exclusion procedure on the resources, wherein the available subframes is capable of simultaneously transmitting all service packets; and
   taking available resources obtained when the quantity or the ratio completely achieves or is higher than the configured number threshold value or ratio threshold value as the available resource set.

4. The method according to claim 1, wherein the selecting the transmission resources from the available resource set, comprises following one of operations:

operation 1:
on each candidate carrier, carrying out an S-RSSI power sorting in the available resource set, and selecting available resources which have a lowest power and achieve a configuration ratio as an available resource subset;
according to an order, selecting available transmission resources for each service packet in sequence; and
respectively selecting the transmission resource for each service packet from the available transmission resources, or selecting the transmission resources for other service packets from the available transmission resources after the transmission resource is selected for a first transmission service packet from the available transmission resources;

operation 2:
on each candidate carrier, carrying out S-RSSI power sorting in the available resource set, and selecting the available resource which has a lowest power and achieves the configuration ratio as the available resource subset;
according to an order, selecting the available transmission resource for each transmission service packet in sequence;
selecting a subframe which meets a quantity of retransmission and initial retransmission transmission resource restriction for a first transmission service packet from the available transmission resources, and selecting the transmission resource for the first transmission service packet on selected subframe; and
respectively selecting transmission resources for other service packets from the available transmission resources.

5. The method according to claim 4, wherein when the selecting the transmission resources from the available resource set, comprises the operation 1, the respectively selecting the transmission resource for each service packet from the available transmission resources, comprises:
in the available resource subset, determining a maximum quantity of transmission allowed on a same subframe when transmission power is not lower than configured reliable transmission power according to a configured maximum quantity of transmission or according to a calculation;
determining available resources overlapped with other service packets transmitted by same UE on a time domain, and marking the available resources as a preferentially selected resource subset;
randomly selecting the transmission resources from the preferentially selected resource subset, wherein the transmission resources are resources on which the available transmission power is lower than or equal to the configured reliable transmission power threshold value or the quantity of transmission in the same subframe does not exceed the configured maximum quantity of transmission in the same subframe, after the available transmission power or the quantity of transmission in the same subframe is calculated according to a total quantity of transmission on the subframe where the transmission resources are located;
with the selected transmission resources, selecting retransmission resources from the preferentially selected resource subset under a condition that the restriction of retransmission resource selection for same service packet is met; and
determining the transmission resource from the retransmission resources, wherein the transmission resource is a resource on which the available transmission power is lower than the configured reliable transmission power threshold value, or the quantity of transmission is greater than the configured maximum quantity of transmission;
wherein the randomly selecting the transmission resources from the preferentially selected resource subset further comprises:
if a quantity of selection achieves a configured quantity threshold value, randomly selecting the transmission resources from the available resource subsets except the preferentially selected resource subset.

6. The method according to claim 5, wherein the selecting the retransmission resources further comprises:
if the quantity of selection achieves the configured quantity threshold value in a process of determining the transmission resources in the retransmission resources, randomly selecting the retransmission resource from the available resource subsets except the preferentially selected resource subset.

7. The method according to claim 4, wherein when the selecting the transmission resources from the available resource set, comprises the operation 1, the order is determined according to a magnitude of frequency domain resources occupied by the transmission service packet and/or a carrier number corresponding to the transmission service packet when the transmission resources are selected for each transmission service packet in sequence according to the order.

8. The method according to claim 4, wherein when the selecting the transmission resources from the available resource set, comprises the operation 2, the respectively selecting the transmission resources for other service packets from the available transmission resources comprises:
distributing the transmission resources to a current service packet on the available subframe where the resources are selected for a previous service packet; and
when a situation that the transmission power is not lower than the configured reliable transmission power according to configuration or calculation is met, determining an allowable maximum quantity of transmission on a same subframe, and if the subframe for the current resource distribution exceeds a restriction of the maximum quantity of transmission, selecting for the current service packet other available subframes which are not selected to distribute the transmission resources.

9. The method according to claim 4, wherein when the selecting the transmission resources from the available resource set, comprises the operation 2, the S-RSSI power sorting used for sorting is an RSSI linear mean value of the residual resources on the subframe.

10. A computer device, comprising a memory, a processor and a computer program which is stored on the memory and operated on the processor, wherein the processor is configured to execute the computer program to realize a resource selection under multiple carriers according to followings:
determining at least one candidate carrier according to a resource occupation exclusion result on each carrier;
setting resources on the candidate carrier to be available, carrying out a resource exclusion procedure on the resources according to a sensing result to obtain an available resource set; and selecting transmission resources in the available resource set, and setting an SPS counter for resource scheduling;
wherein the setting the SPS counter used for resource scheduling comprises: randomly selecting the SPS counter in a configured SPS counter range to serve as the SPS counter of the service packets for current resource selection.

11. The device according to claim 10, wherein the selecting the transmission resources from the available resource set comprises: sorting an S-RSSI, and selecting the transmission resources from the available resource set with lower S-RSSI.

12. The device according to claim 10, wherein the carrying out a resource exclusion procedure on the resources according to the sensing result comprises:
on the candidate carrier, excluding a candidate resource corresponding to a skip subframe; and/or, on the candidate carrier, respectively excluding reserved resources corresponding to occupied resources;
after the resource exclusion procedure on the resources is carried out, calculating to obtain a ratio of residual resources respectively according to a size of each service packet, and if the ratio does not completely achieve or is not higher than a configured ratio threshold value, executing an exclusion procedure again after a received power threshold value is added with a preset value each time until the ratio completely achieves or is higher than the configured ratio threshold value after the resource exclusion procedure on the resources; and
taking available resources obtained when the ratio completely achieves or is higher than the configured ratio threshold value as the available resource set;
or
the carrying out the resource exclusion procedure on the resources according to the sensing result to obtain the available resource set comprises:
on the candidate carrier, excluding the candidate resource corresponding to a skip subframe; and/or, on the candidate carrier, respectively excluding reserved resources corresponding to the occupied resources;
after the resource exclusion procedure on the resources is carried out, determining a quantity of available subframes, and if the quantity of the available subframes or a ratio of the available subframes in candidate resource subframes does not achieve or is not higher than a configured number threshold value or a ratio threshold value, executing the exclusion procedure again after the received power threshold value is added with the preset value each time until the quantity of the available subframes or the ratio of the available subframes in the candidate resource subframes achieves or is higher than the configured number threshold value or the ratio threshold value after the resource exclusion procedure on the resources, wherein the available subframes is capable of simultaneously transmitting all service packets; and
taking the available resources when the quantity of available subframes or the ratio of the available subframes in the candidate resource subframes achieves or is higher than the configured number threshold value or the ratio threshold value as the available resource set.

13. The device according to claim 10, wherein the selecting the transmission resources from the available resource set comprises following operations:
operation 1:
on each candidate carrier, carrying out an S-RSSI power sorting in the available resource set, and selecting the available resources which have a lowest power and achieve a configuration ratio as the available resource subset;
according to an order, selecting available transmission resources for each transmission service packet; and
respectively selecting the transmission resource for each service packet from the available transmission resources, or selecting the transmission resources for other service packets from the available transmission resources after the transmission resource is selected for a first transmission service packet from the available transmission resources;
operation 2:
on each candidate carrier, carrying out an S-RSSI power sorting from the available resource set, and selecting the available resource which has a lowest power and achieves the configuration ratio as the available resource subset;
according to an order, selecting the available transmission resource for each transmission service packet in sequence;
selecting the subframe which meets a quantity of retransmission and initial retransmission transmission resource restriction for a first transmission service packet from the available transmission resources, and selecting the transmission resource for the first transmission service packet on selected subframe; and
respectively selecting the transmission resources for other service packets from the available transmission resources.

14. The device according to claim 13, wherein when the selecting the transmission resources from the available resource set, comprises the operation 1, the respectively selecting the transmission resource for each service packet from the available transmission resources comprises:
in the available resource subset, determining a maximum quantity of transmission allowed on a same subframe when the transmission power is not lower than configured reliable transmission power according to a configured maximum quantity of transmission or according to a calculation;
determining available resources overlapped with other service packets transmitted by same UE on a time domain as a preferentially selected resource subset;
randomly selecting the transmission resources from the preferentially selected resource subset, wherein the transmission resources are resources on which the available transmission power is lower than or equal to the configured reliable transmission power threshold value or the quantity of transmission in the same subframe does not exceed the configured maximum quantity of transmission in the same subframe, after the available transmission power or the quantity of transmission in the same subframe is calculated according to total quantity of transmission on the subframe where the transmission resources are located;
with the selected transmission resources, selecting retransmission resources from the preferentially selected resource subset under a condition that the restriction of retransmission resource selection for same service packet is met; and
determining the transmission resource from the retransmission resources, wherein the transmission resource is a resource on which the available transmission power is lower than the configured reliable transmission power threshold value, or the quantity of transmission is greater than the configured maximum quantity of transmission;

wherein the randomly selecting the transmission resources from the preferentially selected resource subset further comprises:

if the quantity of selection achieves a configured quantity threshold value, randomly selecting the transmission resources from the available resource subsets except the preferentially selected resource subset.

15. The device according to claim 14, wherein the selecting retransmission resources further comprises:

if the quantity of selection achieves the configured quantity threshold value in a process of determining the transmission resources from the retransmission resources, randomly selecting the retransmission resources from the available resource subsets except the preferentially selected resource subset.

16. The device according to claim 13, wherein when the selecting the transmission resources from the available resource set, comprises the operation 1, the order is determined according to a magnitude of frequency domain resources occupied by the transmission service packet and/or a carrier number corresponding to the transmission service packet when the transmission resource is selected for each transmission service packet in sequence according to the order.

17. The device according to claim 13, wherein when the selecting the transmission resources from the available resource set, comprises the operation 2, the respectively selecting the transmission resources for other service packets from the available transmission resources comprises:

distributing the transmission resource to a current service packet on the available subframe where the resources are selected for a previous service packet; and when a situation that transmission power is not lower than the configured reliable transmission power is met according to configuration or calculation, determining the allowable maximum quantity of transmission on the same subframe, and if the subframe of the current distribution resource exceeds a restriction of a maximum quantity of transmission, selecting for the current service packet other available subframes which are not selected to distribute the transmission resources.

18. The device according to claim 13, wherein when the selecting the transmission resources from the available resource set, comprises the operation 2, the S-RSSI power sorting used for sorting is the RSSI linear mean value of the residual resources on the subframe.

* * * * *